May 23, 1961 J. E. McKEEN 2,985,743
WELDING APPARATUS AND METHOD
Filed Nov. 19, 1957 9 Sheets-Sheet 1

J. E. McKEEN

2,985,743

WELDING APPARATUS AND METHOD

Filed Nov. 19, 1957

J. E. McKEEN

2,985,743

WELDING APPARATUS AND METHOD

Filed Nov. 19, 1957

May 23, 1961  J. E. McKEEN  2,985,743
WELDING APPARATUS AND METHOD
Filed Nov. 19, 1957
9 Sheets-Sheet 8

May 23, 1961  J. E. McKEEN  2,985,743
WELDING APPARATUS AND METHOD
Filed Nov. 19, 1957  9 Sheets-Sheet 9

2,985,743
WELDING APPARATUS AND METHOD

Joseph E. McKeen, San Francisco, Calif.
(10861 Elm Ave., Lynwood, Calif.)

Filed Nov. 19, 1957, Ser. No. 697,455

16 Claims. (Cl. 219—73)

This invention relates to electric welding, and more particularly to novel methods and apparatus involving the principles of resistance welding.

The welding of thin metal strips or sheets is difficult because of their susceptibility to damage from arcing or excessive pressure. It is necessary to control accurately the location, duration and magnitude of the electric current so that these materials to be welded are not damaged. Means are known in the art for the accurate control of the electric welding current but variations in the conditions and compositions of the workpieces to be welded present problems which cannot be overcome by accurate control of the welding current alone. For example, a varying electrical resistance, along the line to be welded, causes uneven distribution of current and this produces a defective product due either to arc damage or to a weak, incomplete weld.

In addition, the application of pressure throughout the welding cycle is critical in nature due to the comparative fragility of the sheet material being welded. In the conventional welding cycle, an initial amount of pressure is applied to the workpieces to maintain them in abutting relationship, welding current is applied, and, when the interface between the workpieces is sufficiently heated, additional forging force is often applied to drive the workpieces into intimate welded relationship. When welding thin material the magnitude of force commonly utilized and particularly this additional forging force distorts or destroys the material unless carefully controlled.

The problems of welding thin material are particularly involved in the production of a honeycomb structure of stainless steel and one of the particular objects of this invention is to provide an apparatus for the welding of thin stainless steel foil into a structurally sound honeycombed structure.

Another and more general object of the invention is to provide an improved method and apparatus suitable for the welding of a wide variety of materials.

Still another object of the invention is to provide a method and apparatus for welding materials whereby the pressure and current applied to the weld area may be accurately controlled.

A further object of the invention is to provide a means for providing an accurately controlled forging force to be applied during the welding cycle, the forging force having a limited stroke such that the welded material is not distorted or destroyed thereby.

A further object of the invention is to provide a method and apparatus for producing a secure and uniform line weld.

Still another object of the invention is to provide a method of applying a controlled pre-pressure to the workpieces to be welded.

The welding process of this invention utilizes a predominantly parallel flow of current through the electrodes or the workpieces to produce a magnetic field which acts on the workpieces to produce a pressure along the entire length of the interface between the workpieces which is controllable electrically. The force produced by these currents is described by the equation $$F = \frac{2II'}{100D}$$

where F is the force in dynes per centimeter, I and I' are the currents flowing in the conductors in amperes, and D is the distance between the conductors in centimeters. The parallel flow of current in addition to producing the desired pressure aids in obtaining the accurate alignment of the electrodes on either side of the area to be welded.

In order to obtain a more desirable current distribution, the conductors preferably provide loop current paths similar in form to hair pins. The current in the adjacent legs of these "hairpins" generally flows in the same direction. The workpieces are placed between the adjacent edges of the loops and the current in each of the loops may be varied as desired depending upon the temperature relationship in the workpieces that is required for maximum welding efficiency.

Welding current flows between the two adjacent conductors through the interface between the workpieces. This welding current may be produced by a potential difference between the conductors due to a difference in the current flowing therein or may be produced by an external source. The phase relationship between the loop currents and the welding current can be adjusted such that the pressure applied during welding may be varied as desired during the cycle. This is especially desirable when the area of contact for welding is small. The flux field set up by the loop currents is at right angles to the flow of the welding current and therefore a force is exerted on the "conductor" carrying the welding current in a direction perpendicular to the flux field and to the "conductor." This force is described by the equation $$F = \frac{HIL \sin \theta}{10}$$

where F is the force in dynes per centimeter, H is the strength of the field in oersteds, I is the current flowing in the conductor in amperes, L is the length of the conductor in centimeters, and θ is the angle between the lines of flux and the conductor. This force tends to cause the welding current to move along the line of contact of the workpieces, i.e. the weld line, thereby compensating for the tendency of the welding current of flow through the workpieces at isolated points of low resistance. I believe a "pinch effect" phenomena, in addition, tends to cause current concentration which thus reduces the width of the line weld while the "motor effect" drives the current along a path perpendicular to the "conductor" and the flux such that a uniform line weld is obtained.

In addition to the requirement that the welding current be of extremely short duration as the metal to be welded must be molten in the area of juncture and relatively cold elsewhere, it is usually desirable to apply additional pressure after the metal has become molten in the form of an impact along the weld line in order to form a weld of superior characteristics. This forging pressure may be applied by judicious control of the loop currents and in certain applications of the principles of the invention this method would be preferable. Another method, utilized in the preferred embodiment, involves the use of a magnetostrictive element to apply this force. With this latter method a mechanical force of predetermined travel and magnitude, accurately controllable in time of application and having relatively little inertia lag is achieved. By this method a forging force may be applied as a single blow or repetitively, as desired.

The use of loop current electrodes enables the area required for a backup electrode to be a minimum and therefore this invention has particular utility where there is restricted access for such electrodes.

The principles of the invention are particularly adapted to the welding of metallic foil into a honeycombed core material such as is used in sandwich pallet constructions, seams of metallic containers and in other applications where a high-speed line weld is desired. In addition to metallic materials, certain non-metallic materials also may be welded utilizing the principles of the invention.

Other objects and advantages of the invention will become apparent from the following description of a preferred embodiment of the invention.

A plan view (Fig. 1) and an elevation (Fig. 2) of the welding apparatus for producing a honeycomb structure from corrugated stainless steel sheet foil are shown in the drawings. The apparatus consists of a fixed table 36 and a movable table 30 about which the operating elements are disposed. The table 30 is movable laterally with respect to the fixed table 36 (to the right in Fig. 1) by a mechanism shown in greater detail in Figs. 12–14 and described in connection therewith and transversely (up and down in Fig. 1) by a mechanism shown in greater detail in Figs. 15 through 20 and described in conjunction therewith.

Figures 5, 6:
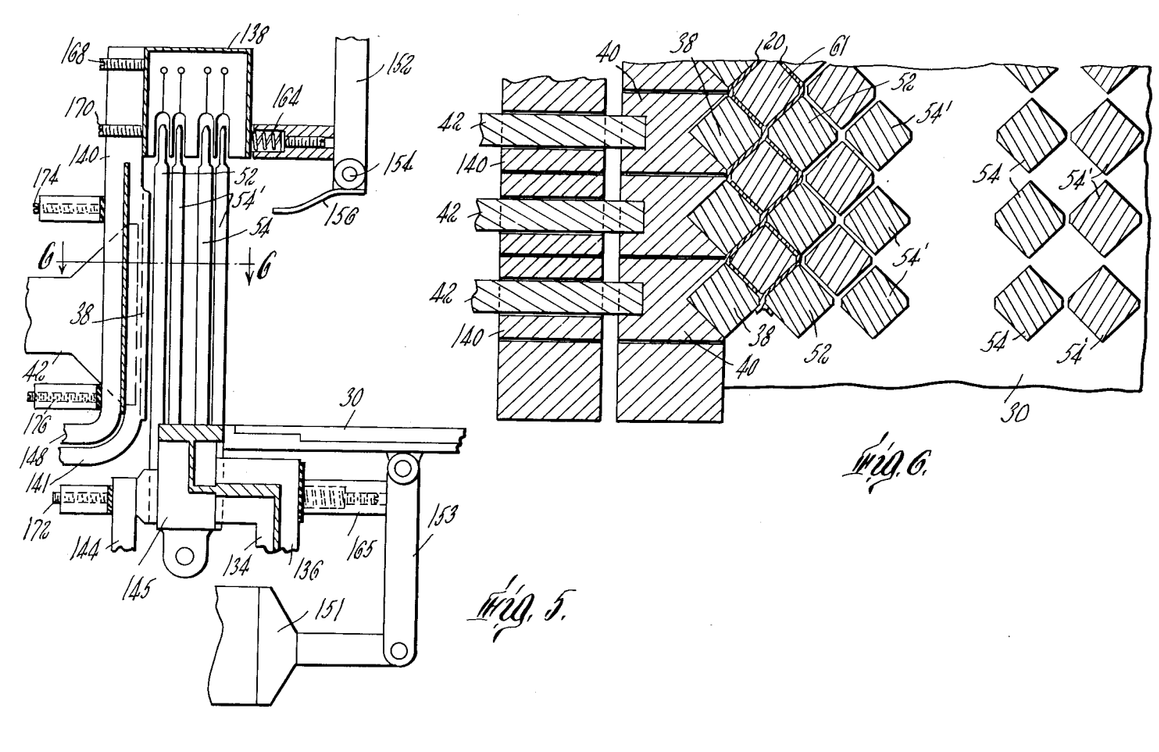
Fig. 5 is a sectional view of the lines 5—5 of Fig. 1 of the portion of the apparatus in the vicinity of the welding electrodes.
Fig. 6 is a sectional view of the welding electrodes along the lines 6—6 of Fig. 5.

A single row of electrodes 38, of suitable alloy are affixed mechanically and electrically to the segmented electrode holder 40. These electrodes are supported from the fixed table 36 and may be best seen in Figs. 5 and 6. The electrode holder is connected to bus bar 140 such that a current carrying loop is provided, which might be described as a hairpin (see Fig. 21). The cross-section of the electrodes may take certain forms other than the square section indicated. In particular the use of electrodes of circular cross-section is desirable in the welding of a modified honeycomb structure.

Figure 21:
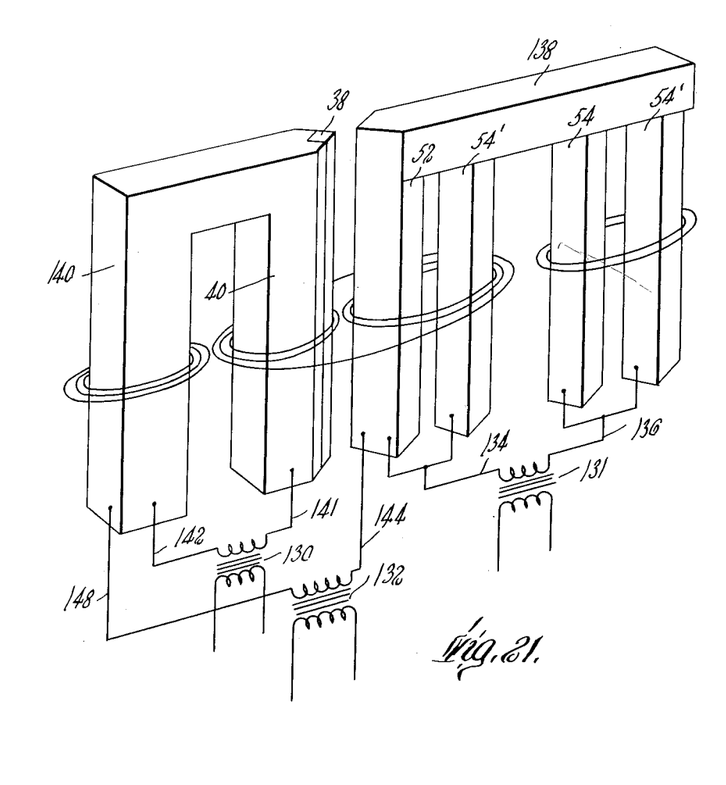
Fig. 21 is a digrammatic view representative of the welding electrodes illustrating certain principles of the invention.

A corresponding row of backing electrodes 52 are disposed in opposed relationship to electrodes 38 and may be raised and lowered through an aperture 34 in the movable table 30 by a mechanism shown in Fig. 2 and described hereinafter. A loop current path is provided for electrode 52 by means for contact block 138 and conductors 54. Thus effectively there are two current loops edgewise to one another as shown in Fig. 21.

The current in the first loop (conductors 40 and 140) is supplied by transformer 130 through bus bar 142, conductor 140, conductor 40 (and electrode 38) and bus bar 141. Current in the second loop (electrode 52 and conductor 54) is supplied by transformer 131 through bus bar 134. A controlled welding current may be caused to flow from electrode 52 to electrode 38 by transformer 132 through bus bar 144, conductor 52, electrode 38, conductor 140 and bus bar 148.

The provision of a number of welding electrode configurations adjacent one another may be utilized to obtain desirable flux patterns. In addition the current distribution to one electrode may be additionally controlled by the position of additional loop current paths, as 54′.

If desired, additional backing members 61, formed of laminated iron, may be incorporated into the backing electrode group to decrease the reluctance of the loop flux and to serve as shaping members about which the honeycomb is pressed by the clamping solenoids 150 and 151 (described hereinafter) to give it a final desired configuration before the welding takes place.

A plurality of bars 42 of magnetostrictive material, such as a suitable iron nickel alloy, are positioned behind the electrode 38. Each bar passes through an insulated slot in conductor 140 and is fitted into a recess in the rear of a segment of holder 40 and is securely attached thereto. (The slot in conductor 140 is insulated to prevent shorting of the vertical loop and to lessen any cushioning effect when the bar is subjected to magnetostrictive forces.) The bars 42 are positioned on an iron core 50. A coil 48 of sufficient capacity to generate a magnetic field of the desired flux density is mounted on the core 50 and is clamped into position by members 51 and 53 which are secured to the fixed table 36.

In certain contemplated applications of the principles of the invention magnetostrictive material having a negative coefficient of expansion is utilized and the welding current is passed through the coil 48. In this manner the pressure on the workpieces is reduced during the welding such that the resistance across the interface is increased and the forging pressure is thus automatically applied with the removal of the welding current.

Figures 2, 3, 4:
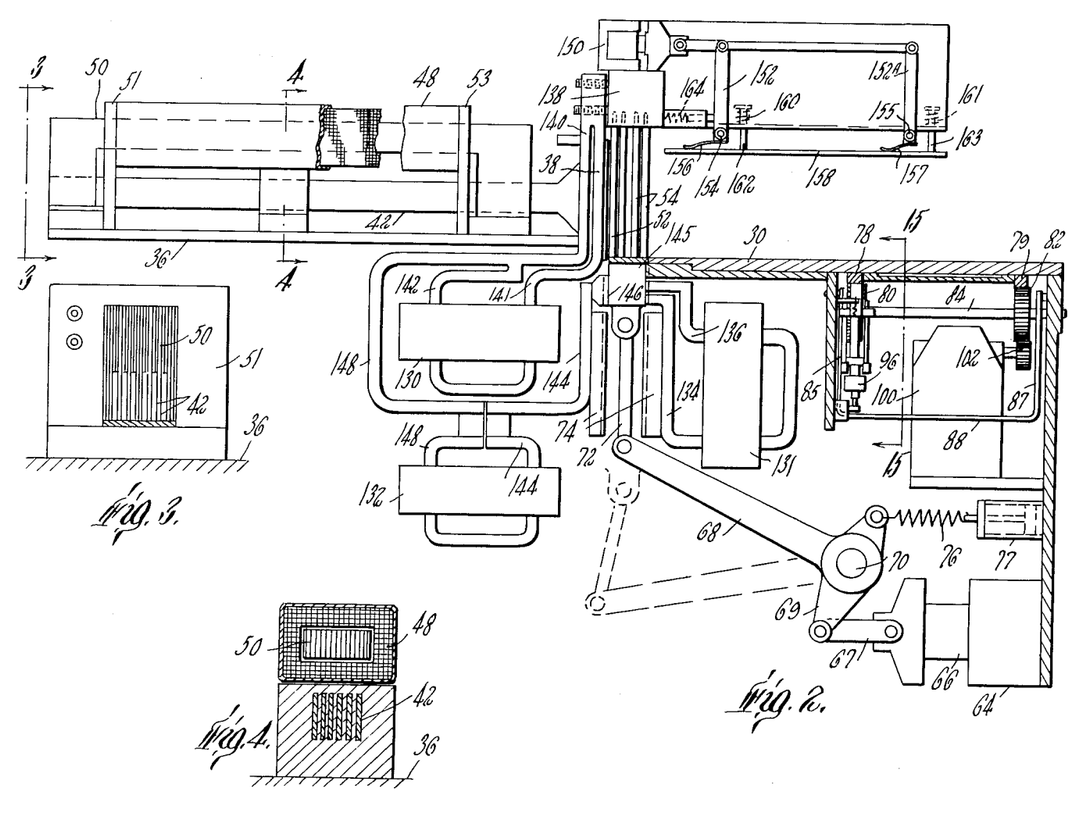
Fig. 2 is a general side elevational view, partly in section along the lines 2—2 of the apparatus of Fig. 1.
Fig. 3 is an end view of the magnetostrictive element associated with the apparatus in Fig. 1.
Fig. 4 is a sectional view of the magnetostrictive structure element along the lines 4—4 of Fig. 2.

The backing electrodes 52 are moved vertically by means of a solenoid and linkage shown in Fig. 2. The solenoid 64, when energized, operates the plunger 66 and linkage arms 67 and 69 to pivot the lever 68 downward about the center 70. The end of lever 68 is attached to the sliding contact member 145 of the electrode and conductor group 52, 54 by means of link 72. Thus, the entire backing electrode group is withdrawn downwardly between the water-cooled slides 74. A spring 76, cooperating with a snubbing piston and cylinder 77, opposes the force of the energized solenoid and urges the electrode group up into the contact member 138 where electrical contact is made by means of spring loaded contacts similar to those well known in circuit breakers.

The mechanism which produces the transverse motion of the table 30 is shown in Figs. 15 through 20. There are two parallel rack gears 78, 79, fastened to the underside of the table 30, which run the entire width of the table. Two driving gears 80 and 82, which are disposed on an axle 84 and keyed in place thereon, mesh with the rack gears 78 and 79 respectively, and when rotated produce the transverse motion of table 30. Axle 84 is rotatably attached to the vertical members 85 and 87 of bracket 88. The bracket itself is pivotally mounted on the support members 90 and 92 at the upper ends of the vertical members 85 and 87 respectively. Thus the gears 82 rotate about the point defined by axle 84 but the location of axle 84 is dependent upon the position of bracket 88 which is pivoted about center 94. The position of the bracket 88 is controlled by an index shift solenoid 96 which operates a latching mechanism 98 which is adapted to cooperate with either of two grooves 200, 202 in the curved plate 204.

Figures 15, 16, 17:
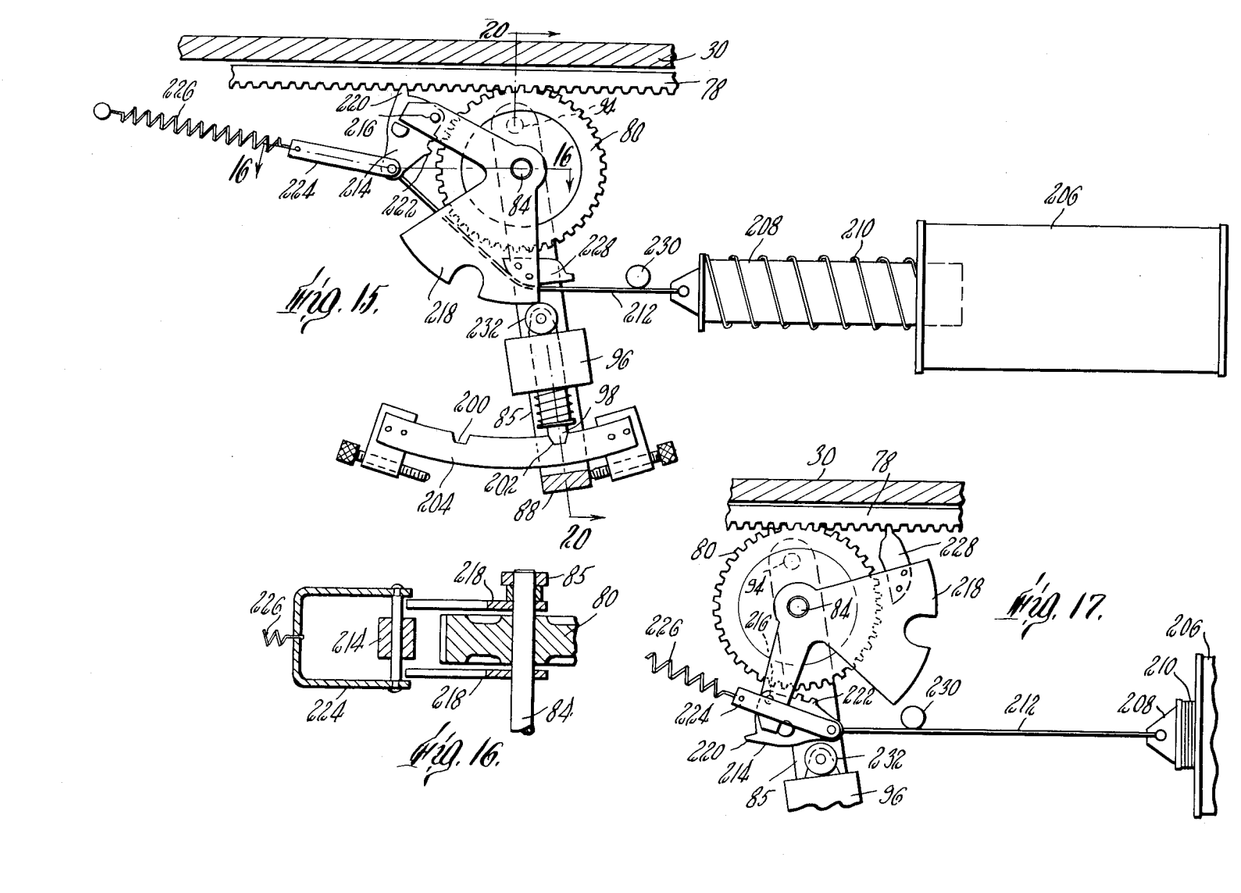
Fig. 15 is a sectional view of the mechanism for moving the table transversely, taken along the lines 15—15 of Fig. 2.
Fig. 16 is a sectional view taken along the lines 16—16 of Fig. 15.
Fig. 17 is a partial view of the mechanism of Fig. 15 illustrating a second position thereof.

The mechanism for rotating the gears 80 and 82 is best understood with reference to Figs. 15 through 17. A plunger type solenoid 206, when energized, pulls the plunger 208 and compresses the spring 210. The end of plunger 208 is connected to one end of the steel band 212, the other end of which is connected to a driving member 214. The driving member 214 is pivotally attached at point 216 to one arm of quadrant 218 and has one tooth 220 adapted to cooperate with the rack 78 as shown in Fig. 15 and a plurality of teeth 222 adapted to cooperate with gear 80 in driving relationship. A bracket member 224 is pinned to the driving member 214 at the same point of connection as band 212. Bracket 224 is connected to spring 226 which pivots the driving member 214 about center 216 such that 220 is maintained in engagement with rack 78 when solenoid 206 is deenergized.

When solenoid 206 is energized, a force is applied through band 212 to pivot the driving member 214 about point 216 such that tooth 220 is disengaged from rack 78 and teeth 222 are engaged in driving relationship with gear 80. In this relationship the gear 80 and quadrant 218 are rotated about axle 84 until stop member 228 engages rack 78. The rotation of gear 80 through coaction with rack 78 provides the desired transverse motion of table 30, which, in the preferred embodiment, is approximately 2.33 inches. Upon the deenergization of solenoid 206 spring 226 returns the drive member and quadrant from the position of Fig. 17 to the position of Fig. 15. As the teeth 222 of the driving member 214 are maintained out of engagement with teeth of gear 80 during this return the table 30 is moved in only one direction by this mechanism.

Figure 18:
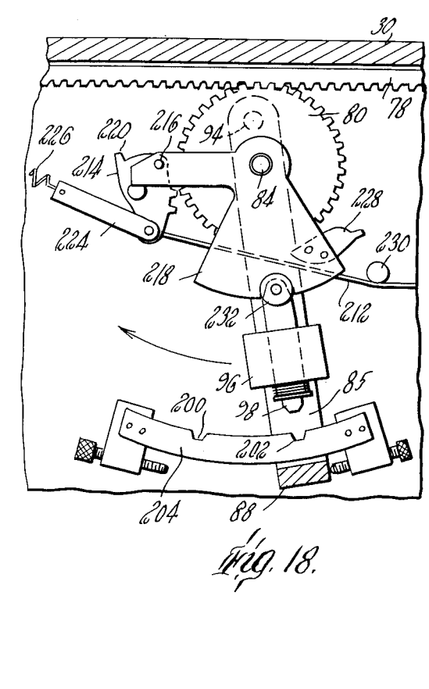
Fig. 18 is a view of a portion of the mechanism of Fig. 15 showing the operation of the index apparatus.
Figure 19:
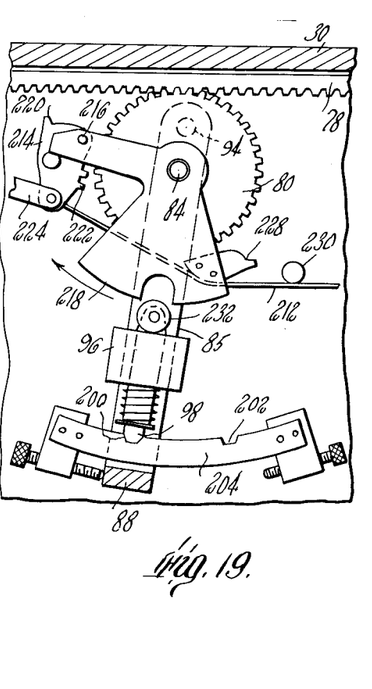
Fig. 19 is a view of a portion of the mechanism of Fig. 15 showing the index apparatus in a second position.
Figure 20:
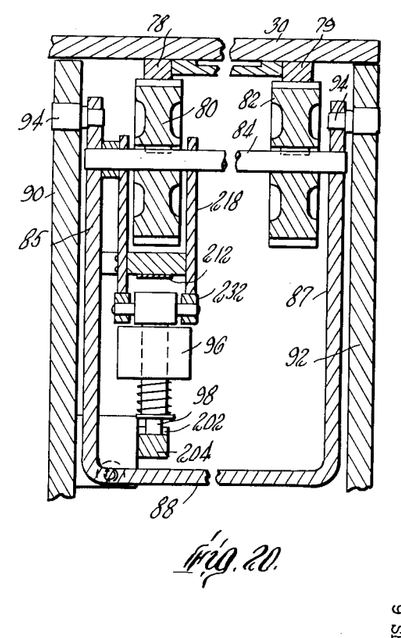
Fig. 20 is a sectional view along the lines 20—20 of Fig. 15.

A variation in distance of transverse motion is required in this embodiment due to the positioning criteria of the corrugated foil material for welding into a honeycomb structure. This variation is provided by the positioning of bracket 88 as controlled by the index shift solenoid 96. A shift of the bracket 88 will be required after each strip is welded in order to properly position the ridges of that strip already attached to the honeycomb opposite those ridges of the next strip which is to be welded to the honeycomb. The index shift solenoid 96 is energized by limit switch (not shown) which is tripped by the table 30 at the end of the transverse movement. At the end of the forward transverse movement the solenoid 96 is in the position shown in Fig. 15. It is energized and locked into quadrant 218 as is shown in Fig. 18. Spring 226 carries bracket 88 back such that latch mechanism 98 would be aligned with slot 200. The solenoid is then deenergized and the latch 98 engages slot 200 (Fig. 19). In this manner the position of the honeycomb has been adjusted so that the ridges thereof line up properly with those of the strip next to be welded. When solenoid 206 is then energized the resulting transverse movement of the table 30 is the desired amount. At the end of this strip the limit switch is again tripped, energizing the solenoid and the latching member 98 is moved to engage slot 202 and the bracket assumes the position shown in Fig. 15 during the next welding strip cycle.

When the table 30 reaches the limit of its motion in the transverse direction a limit switch, not shown, is tripped and energizes the electric motor 100 which returns to table 30 in the opposite transverse direction towards its initial position through the gear train consisting of gear 102, gears 80 and 82 and rack gears 78 and 79. In this manner, the apparatus is made ready to make a series of welds on the next strip of corrugated material. A contemplated modification of the disclosed embodiment incorporates two rolls of foil and associated apparatus such that the machine welds during both the forward and return travels of the table 30.

Figures 12, 13, 14:
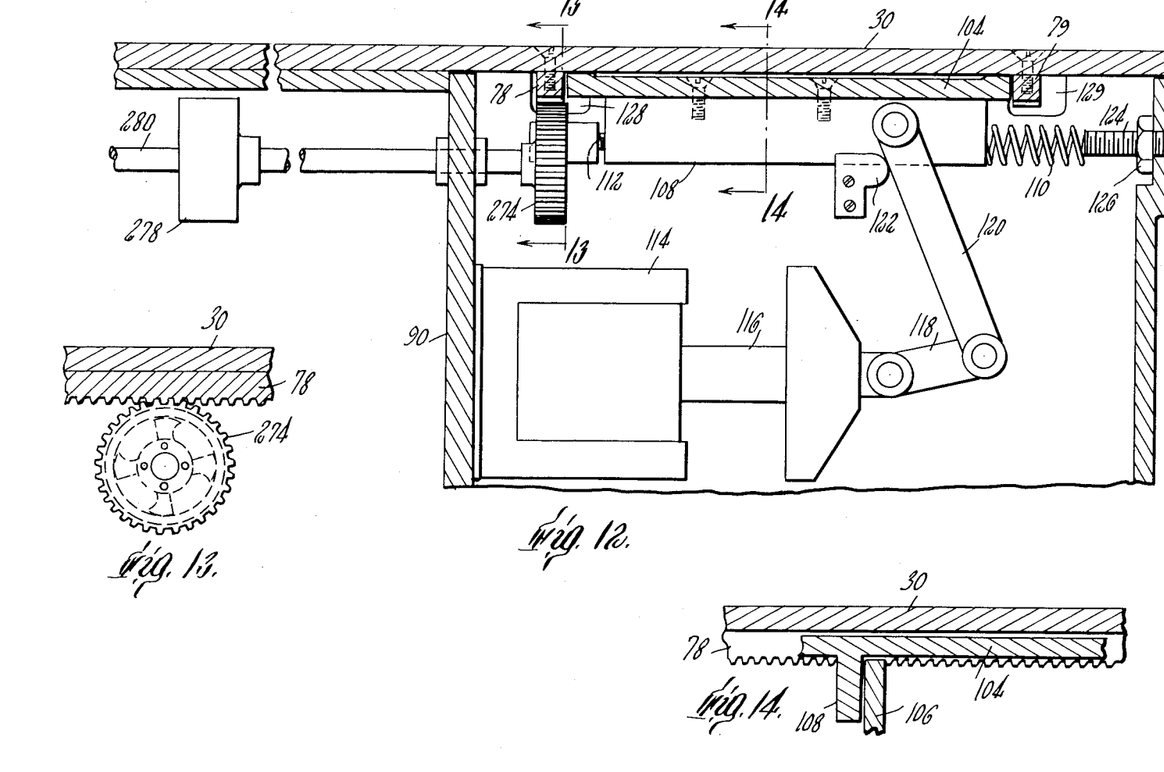
Fig. 12 is a sectional view of the mechanism for producing lateral movement of the table taken along the lines 12—12 of Fig. 1.
Fig. 13 is a sectional view taken along the lines 13—13 of Fig. 12.
Fig. 14 is a sectional view taken along the lines 14—14 of Fig. 12.

The mechanism which produces the lateral motion of the table 30 (away from and towards the stationary table 36) is shown in Figs. 12 and 14. A plate 104 is slidably mounted on a plurality of vertical fixed walls 106, one of which is shown in Fig. 14. The plate 104 is disposed between the racks 78 and 79 and has a flat bar 108 bolted to it. The plate 104 is normally positioned between the racks 78, 79 by the spring 110 which forces the bar 108 against the set screw 112. Attached to the support wall 90 is a solenoid 114 which, when energized, pulls the plunger 116 and, through link 118, causes the lever 120 to pivot about the fulcrum 122 which is mounted on the wall 106. The upper end of the lever 120 is pivotally attached to the bar 108 and consequently the energization of solenoid 114 forces the plate 104 against rack 79. As table 30 is attached to the rack 79 it is moved in the lateral direction a distance determined by the compression of spring 110 as adjusted by the screw 124 and bolt 126, which acts in opposition to the force of the solenoid 114. The lateral motion of table 30 is absolutely limited by the dimensions of slots 128, 129 through which the rack gears 78, 79 respectively pass. When the solenoid 114 is deenergized the spring 110 returns the plate 104 and the bar 108 to a position in abutment with set screw 112 and the table 30 is returned by a coaction of plate 104 with rack 78.

Figure 1:
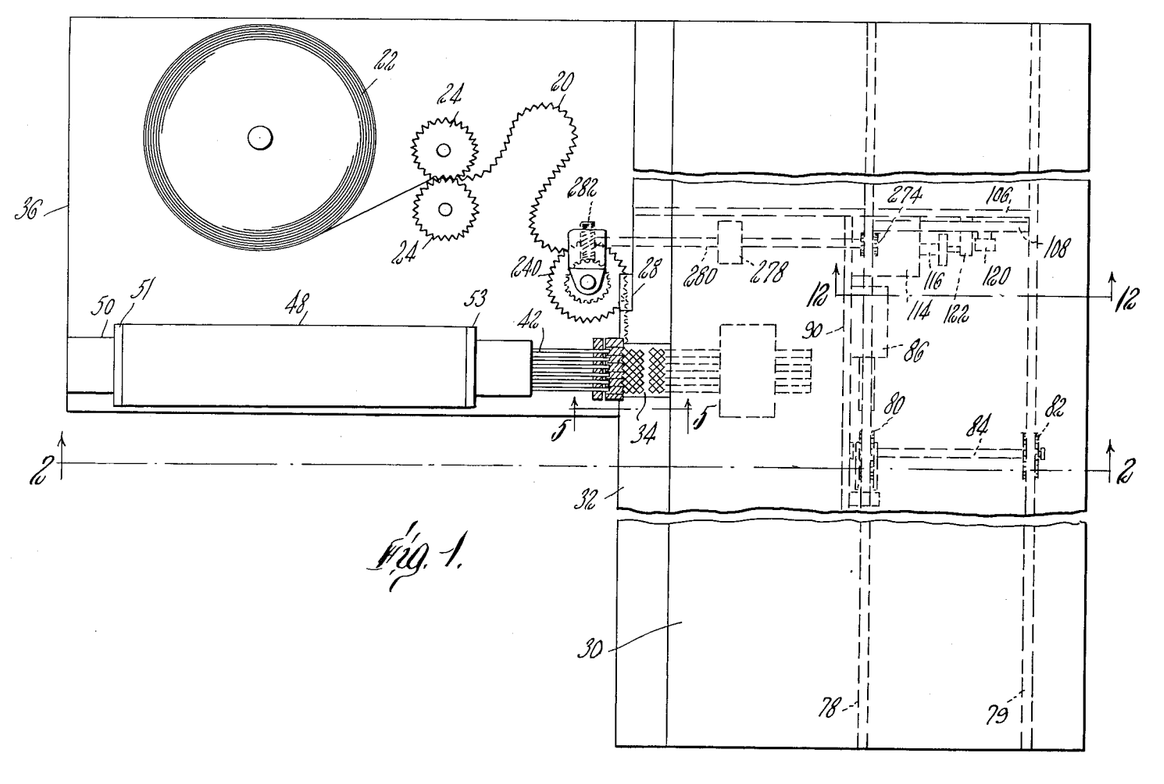
Fig. 1 is an overall plan view of the preferred embodiment of welding apparatus adapted to fabricate a honeycomb structure from corrugated sheet metal foil.

The metal foil 20, which is to be welded, is supplied from a stock roll 22, shown in Fig. 1. It is fed through two forming rolls 24 which corrugate the foil such that a series of ridges alternating from side to side of the foil are formed. The corrugated material is then fed into a metering and cut-off mechanism, a loop of excess material being provided between the forming wheels 24 and the cut-off and metering mechanism to prevent damage to or distortion of the corrugated foil.

Figures 7, 8, 9, 10, 11:
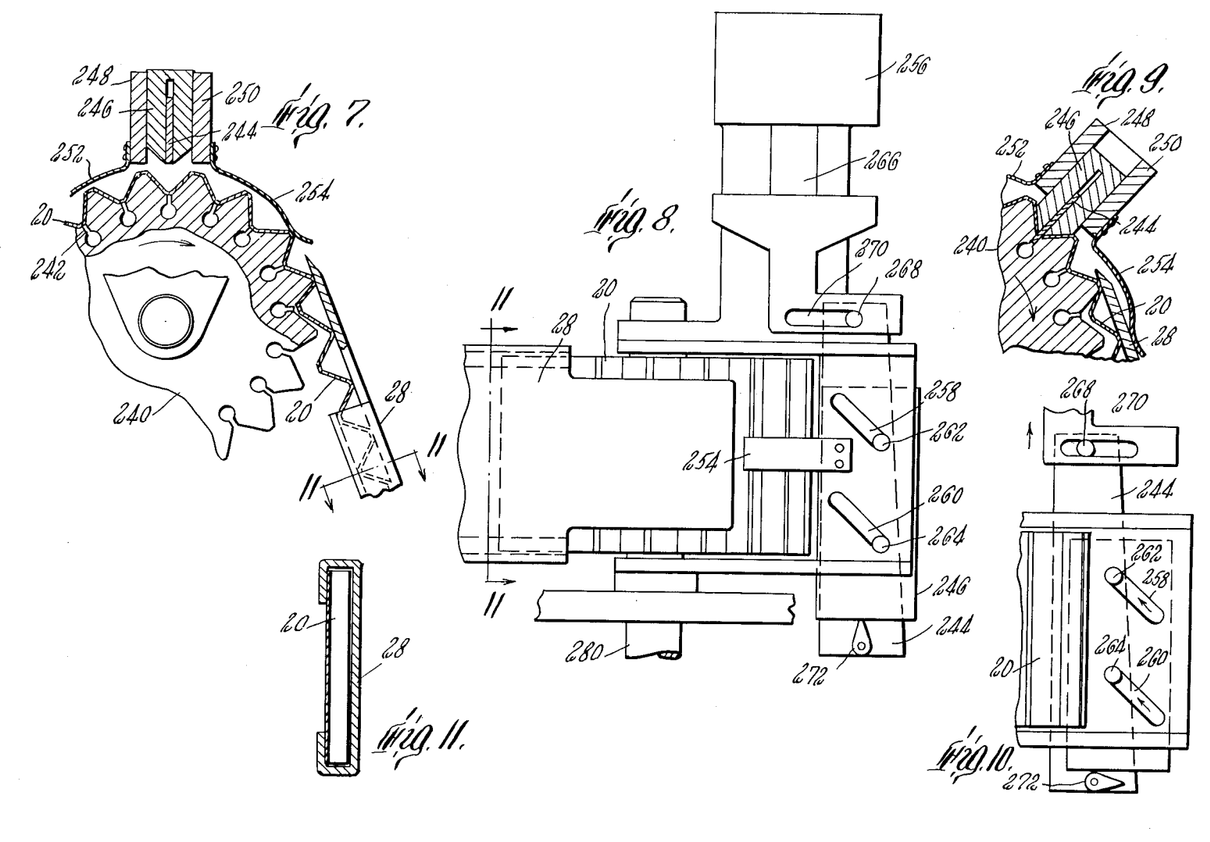
Fig. 7 is a view in partial section of the metering and cut-off apparatus.
Fig. 8 is a top view of the metering and cut-off apparatus.
Fig. 9 is a sectional view of a portion of the cut-off apparatus in a second position.
Fig. 10 is a top view of a portion of the cut-off apparatus in a second position.
Fig. 11 is a sectional view along the lines 11—11 of Fig. 7.

The details of the metering and cut-off mechanism is shown through Figs. 7 and 10. The periphery of the metering wheel 240 is formed into a configuration such that the corrugated foil 20 mates therewith and is fed by the metering wheel into a guide member 28. A slot 242 is provided at the base of each tooth such that two edges are formed which act as cooperating shear members with a shear blade 244. The shear blade 244 is mounted in an indexing member 246 which is positioned betwen guide members 248, 250. Sheet spring members 252 and 254 are attached to the guide members 248 and 250 respectively to assure the positioning of the corrugated foil 20 in the grooved periphery of the metering wheel 240. The blade 244 and index 246 are operated by a solenoid 256, which when energized, picks up the blade and index mechanism as shown in Fig. 8. The index member 246 is then moved downward into a groove such that the foil 20 is clamped in the groove. This motion is produced by the diagonal slots 258 and 260 in the guide members 248 and 250 in which pins 262 and 264, attached to the index 246, are disposed. The armature 266 of the solenoid 256 is attached to the blade 244 by means of a pin 268 and slot 270 connection. The blade is positioned with respect to the index member by means of the cam 272. Thus, when the solenoid 256 is first energized the index 246 is moved into cooperation with a groove in the periphery of the metering wheel 240 to clamp in position the foil 20. In this position the index and blade rotate with the metering wheel 240 to the position shown in Fig. 9 at which time the cam 272 is tripped and the blade 244 is driven by the solenoid 256 through the foil 20 to cleanly sever a desired length of foil. The solenoid 256 is then deenergized and the blade and index are returned to the position of Fig. 7.

The metering wheel is driven by the indexing mechanism shown and described in conjunction with Figs. 15 through 20. Gear 274 (shown in Fig. 12) is driven by rack gear 78 and through clutch 278 it turns shaft which in turn rotates shaft 280 of the metering wheel 240 through gear mechanism 282. Clutch 278 is of the conventional type which drives shaft 280 in one direction only so that the metering wheel is advanced as the table 30 advances but is not moved when the table 30 is returned by the motor 100.

The severed sheet of corrugated foil is passed through guide 28 into the welding area. When so positioned mechanical pressure is applied by solenoid 150 (shown in Fig. 2) and solenoid 151 (shown in Fig. 5) acting through linkages 152 and 153 respectively against the upper and lower ends of the conductors 52 and 54 to move the backing electrodes 52 and a first sheet of foil 20 toward a second sheet of foil 20 and the welding electrode 38. Cross bar 164 is interposed between the linkage 152 and the connector member 138 and cross bar 165 is interposed between the linkage 153 and the bus bars 134 and 136. Each cross bar rides in a slot in the stationary frame and has internal springs and adjusting screws associated with each segment. The purpose of these mechanical pressure devices are two fold: they apply pressure to force the foil into place such that adequate contact is made against the electrode faces and they assure adequate contact between the bus bars 134 and 136 and the sliding contact member 145. Set screws 168, 170, and 172 provide stop adjustments for these pressures. In addition set screws 174 and 176 (shown in Fig. 5) provide horizontal adjustment of the stationary electrodes 38.

An additional clamping mechanism (shown in Fig. 2) is provided to securely position the honeycomb structure during welding operations. This consists of a linkage 152A parallel to linkage 152. As the links 152 and 152A are pivoted about centers 154 and 155 respectively, the spring members 156 and 157 attached to their lower ends are pressed against plate 158, causing that plate to contact and positively position the honeycomb structure beneath it. The plate 158 is resiliently positioned upon the supporting structure by springs 160 and 161 which coacts with studs 162 and 163 respectively.

Figure 23:
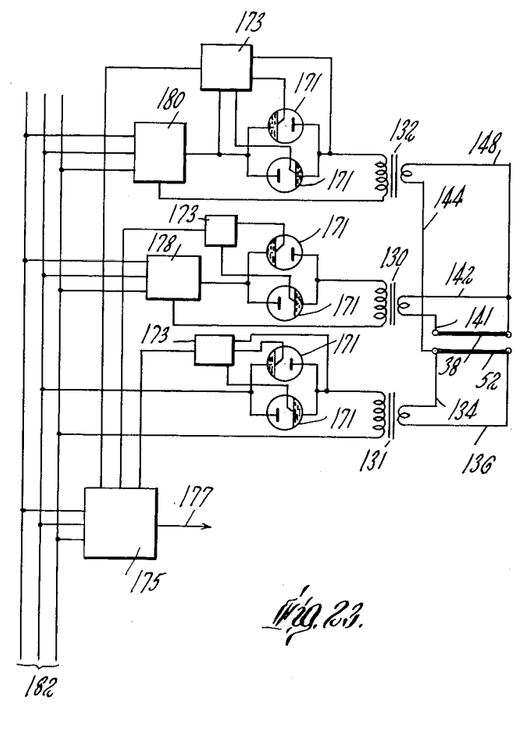
Fig. 23 is a block diagram of a suitable welding control circuit for use with the preferred embodiment of the invention.

Figure 23 is a schematic diagram of suitable circuitry for the control of the transformer currents utilized in this embodiment. The primary of each transformer is controlled by two mercury arc rectifiers 171. Associated with each pair of rectifiers is an arc initiation control circuit 173, each of which is in turn controlled by a common control circuit 175. In addition to controlling the rectifiers, circuit 175 also develops signals for controlling the various solenoids and other electrical equipment in the embodiment which are distributed over lines 177. The control circuitry for transformer 130 has a phase shifting circuit 178 associated with it such that the phase relationship between the loop currents in electrodes 38 and 52 may be adjusted and controlled. Additionally a phase shift circuit 180 is provided to control the phase relationship of the welding current as produced by transformer 132 with respect to those currents produced by transformers 130 and 131. Power for the entire welding control circuitry is provided from the 220 volt 60 cycle three phase line 182.

The transformers are designed in accordance with criteria well known in the art and commensurate with the application. In some applications the transformers may be wound on a common core. Where desirable a plurality of secondary windings may be provided, one for each weld that is to be performed simultaneously.

Mechanical and electrical operations involved in performing a welding operation will be described in conjunction with the graphs of Figs. 24 and 25. The operation of the machine may be broken into four sequences; mechanical alignment, prepressure, welding and forging pressure.

Mechanical alignment

At the completion of the previous welding cycle the electrodes 52 and 54 are retracted by the solenoid 64 and the welded honeycomb is moved laterally by the operation of solenoid 114. The table is then moved transversely by the operation of the mechanism associated with solenoid 206 and the metering wheel 240 is rotated to feed a predetermined length of foil into the welding area adjacent electrode 38. Solenoid 114, which produces the lateral movement of the table 30, is then deenergized and the table is moved toward the electrode 38 such that the crests of the completed honeycomb structure are placed adjacent corresponding ridges of the foil. The electrodes 52 and 54 are then raised by operation of solenoid 64 and are driven up into the contact block 138 such that the loop paths for current flow are completed. The solenoids 150 and 151 are then energized to position the contact block 138 and the bus bars 134 and 136 thus assuring correct alignment and adequate electrical contact.

Pressure

An additional clamping pressure is applied to the members to be welded by means of loop currents which are flowing substantially in phase through the adjacent electrodes 38 and 52. Assuming the voltages are shown as curve 190, Fig. 25, the currents produced thereby lag 90 degrees (curve 191). These currents produce a flux field in a plane perpendicular to the electrodes and varying substantially as shown by curve 192. This field produces a force which tends to seat the electrodes in their proper position. The force produced by the parallel currents may be understood as illustrated in Fig. 21. The current flowing in each of electrodes 38 and 52 generates a radial magnetic flux field in like directions which produces a force proportional to the currents flowing in the two conductors. This method of applying prepressure allows accurate control of pressure through control of the magnitude of the loop currents and very precise timing since the inertia inherent in conventional mechanical methods of applying pressure is eliminated.

Welding current

Figures 24, 25:
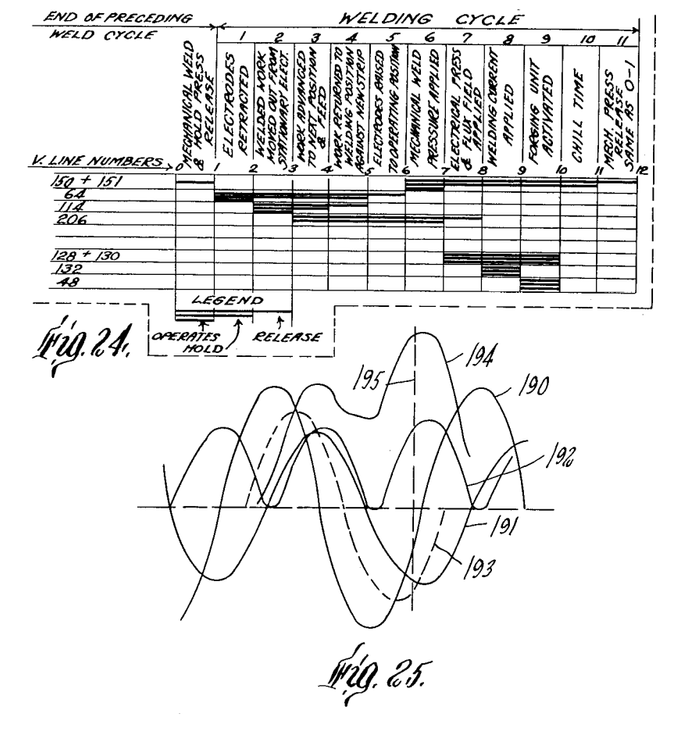
Fig. 24 is a graphical representation of the operation of the apparatus of the preferred embodiment during a welding cycle.
Fig. 25 is a graphical representation of the voltage, current, temperature, flux and force relationships during a welding cycle.

The welding current shown by line 193 in Fig. 25 is applied approximately one-half cycle after the flux fields have produced a maximum force. The temperature at the interface of the material to be welded is approximately indicated by curve 194. As the current is flowing through the interface in a direction substantially perpendicular to the lines of flux produced by the parallel currents between the electrodes 38 and 52 a force is exerted on the "conductor" carrying this welding current in a direction perpendicular to the flow of current and perpendicular to the lines of flux. This is termed herein the "motor effect." The current which tends to flow through areas of low resistance in the interface is thus forced along a line perpendicular to the current flow, which, by virtue of the location of the magnetic field, is coincident with the desired line of weld. Thus, comparatively uniform heating of the entire junction line is achieved and the current, as concentrated by the "pinch effect," is driven along the interface such that a uniform line weld is obtained.

Forging pressure

When the metal at the interface has been brought to a molten state, it is desirable to apply an additional pressure or forging force along the interface in order to achieve a superior weld. Such an impact is provided in the embodiment by sending an accurately controlled current through the magnetostrictive coil 48. Due to the magnetostrictive characteristics of the bars 42 they are caused to change dimensions rapidly a predetermined, controllable and limited amount, thereby forcing the electrodes 38 sharply towards electrodes 52 and applying a forging force to the work interface. If desired, the forging force may be repetitively applied as by exciting the magnetostrictive coil 48 with a signal having a frequency in the order of 20 kilocycles per second. The period of applying the forging force is indicated on Fig. 25 by line 195.

After these operations have been performed and a sufficient time has elapsed such that the weld is adequately chilled solenoids 150 and 151 are deenergized. The cycle just described may be then repeated to perform additional welds.

Figure 22:
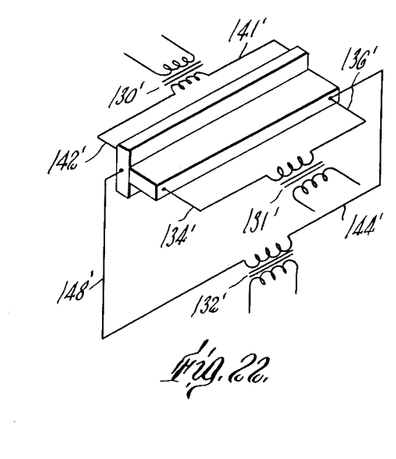
Fig. 22 is a diagrammatic representation of a modified embodiment of the invention.

It is obvious that a series of welds may be made along a single strip of foil, the table 30 being moved transversely several steps before the motor 100 is energized to return the table. Additionally the electrodes 38 and the associated equipment may be movable if desired. The number of welds which may be made simultaneously is primarily determined by the economic considerations involved in the application of the invention. Four welding electrodes have been shown in the diagram. It is also apparent that the principles of the invention may be utilized as shown in Fig. 22 wherein parallel loop currents are passed through the actual workpieces which are to be welded together. In this manner structural members, such as the illustrated T, of various sizes and composed of dissimilar materials may be easily and quickly fabricated. The welding current may be provided by a separate source or by shifting the phase relationship between the parallel loop currents. In addition the loop currents may be varied in magnitude where it is desirable to have one metal at a higher temperature than the other before the welding current flows such that the contact and work potentials of different metals may be overcome.

Loop conductors may be arranged singly or grouped, as in a toroid, where such design is advantageous. In such a group arrangement it is frequently desirable to inductively couple the entire group of conductors to an exciting source. The flexibility achieved through such inductive coupling principles is equally applicable to other applications of the invention.

Another contemplated modification involves the distortion of the magnetic field to achieve a concentration of current in a desired location. Such a technique may be particularly useful with the welding of irregular shapes.

Through control of the magnitude, frequency and phase relationships of welding current and loop currents, it is possible to achieve such results as the production of a weld of varying density, the control of the direction of transfer and deposit of material between the workpieces and the joining of dissimilar materials. Further the techniques involved in the invention are applicable to brazing operations as well as welding.

In conclusion, although there has been shown and described a welding apparatus for the welding of honeycomb structures, other applications of the principles of the invention are obvious, a primary one being the seam welding of metal cans. The seams of such cans could be welded either by butt welding or lap welding procedures with equipment utilizing the principles of the invention. Accordingly, the invention is not intended to be limited by or to the details of the described embodiment and departures may be made therefrom within the spirit and scope of the invention as set forth in the appended claims.

What is claimed is:
1. The method of forming a member having a plurality of apertures therethrough in the nature of a honeycomb, comprising the steps of corrugating sheet metal to form alternating ridges therein, aligning a first portion of said corrugated metal with a second portion such that ridges of the first portion are aligned with and abut ridges of said second portion, locating electrodes adjacent said abutting ridges on opposite sdes thereof to maintain said ridges in abutting relationship, said electrodes including current paths arranged to provide a first current path on one side of said abutting ridges parallel to said ridges and to a second current path on the opposite side of said abutting ridges, passing electric current along said current paths substantially in the same direction, passing a weld current from one electrode to the other through said abutting ridges, and applying a force to said abutting ridges to drive them into more intimate relationship.

2. The method of forming a member having a plurality of apertures therethrough in the nature of a honeycomb comprising the steps of corrugating sheet metal to form alternating ridges therein, aligning a first portion of said corrugated metal with a second portion such that ridges of the first portion are aligned with and abut ridges of said second portion, locating electrodes adjacent said abutting ridges to maintain said ridges in abutting relationship, said electrodes including current paths arranged to provide a first current path on one side of said abutting ridges parallel to said ridges and to a second current path on the opposite side of said abutting ridges, passing electric currents through said electrodes substantially in the same direction, passing a welding current from one electrode to the other through said abutting ridges, and applying a direct forging force by magnetostrictive means to said abutting ridges to drive them into more intimate relationship.

3. The method of welding comprising the steps of forming an interface between two materials to be welded together, producing a magnetic field about said interface by passing electric currents in the same direction along paths parallel to said interface on both sides thereof, and passing a welding current through said interface, said magnetic field being disposed relative to said interface such that said field exerts a force on said welding current which tends to move said current along said interface such that a continuous line weld is produced.

4. The method of forming a series of interconnected metallic cells which comprises the steps of corrugating a long thin metal sheet to form a plurality of ridges, placing said ridges against a second metallic sheet such that ridges thereof contact said second sheet to form a plurality of interfaces, positioning pairs of electrodes of high electrical conductivity relative to said sheets such that the two electrodes of each pair are disposed on opposite sides of said sheets adjacent an interface, passing electric current through said pairs of electrodes in substantially the same directions such that the resultant magnetic force tends to force the electrodes in each pair toward one another applying pressure to the workpieces at the interfaces, and passing welding current between opposed pairs of electrodes through said interfaces to weld the two sheets together, said magnetic force acting on said welding current to move said currents along the interfaces such that a continuous line weld is produced.

5. An electric welding apparatus comprising in combination, means for placing first and second workpieces in contact with one another such that an interface where said workpieces are to be joined together is defined, means for producing a magnetic field about said interface by passing electric currents in the same direction along paths parallel to said interface on both sides thereof and means to pass electric current from one workpiece to the other through said interface to weld said workpieces together, said magnetic field being disposed relative to said interface such that it exerts a force on said electric current which tends to move said current along said interface such that a continuous line weld between said workpieces is produced.

6. The apparatus as claimed in claim 5 and further including electrodes positioned on either side of said workpieces parallel to said interface, said electrodes providing the paths for said electric currents.

7. The apparatus as claimed in claim 6 wherein each of said electrodes includes a second current path disposed in the plane defined by the associated pair of electrodes adjacent and parallel to the first current path defined by said electrodes, said paths being connected such that the electric current travels in opposite directions along said adjacent paths producing a magnetic field about said path portions such that those portions of each electrode tend to be forced apart.

8. The apparatus as claimed in claim 5, further including means to apply forging pressure comprising a bar of magnetostrictive material positioned in contact with one electrode to move said workpiece relative to the other workpiece when said bar is immersed in a second magnetic field, and means to produce said second magnetic field about said bar such that a forging pressure may be applied to said interface.

9. Apparatus for manufacturing a corrugated core structural material by welding spaced apart ridges of a corrugated strip to a second strip comprising means to place said strips adjacent one another such that said ridges contact portions of said second strip to form a plurality of interfaces, a first set of electrodes adapted to be positioned adjacent said interfaces on one side of said strips, a second set of electrodes adapted to be positioned opposite said first set on the other side of said metal strips such that an interface is located between each pair of opposed electrodes, means to pass electric currents through said two sets of electrodes simultaneously and in substantially the same direction to produce a magnetic field about each pair of opposed electrodes, said magnetic field acting to force the electrodes in each pair toward one another, and means to pass welding current between said opposed pairs of electrodes through said strips and said interfaces to be welded, said magnetic fields exerting influences on said welding currents to force them along the interfaces between said electrode pairs such that continuous seam welds are produced.

10. The apparatus as claimed in claim 9 wherein each of said electrodes includes a second current path disposed in the plane defined by the associated pair of electrodes adjacent and parallel to the first current path defined by said electrodes, said paths being connected such that the electric current travels in opposite directions along said adjacent paths producing a magnetic field about said path portions such that those portions of each electrode tend to be forced apart.

11. The apparatus as claimed in claim 9 further including means to apply forging pressure comprising a plurality of bars of magnetostrictive material positioned to contact the electrodes of one of said sets to move electrodes of said one set relative of the electrodes of the other set when said bars are immersed in a second magnetic field, and means to produce said second magnetic field about said bars such that a forging pressure may be applied to said interfaces.

12. In an electric welding apparatus, in combination, a pair of relatively movable electrodes, means to introduce two pieces of material to be welded between said electrodes such that the surfaces of said pieces are in abutting relationship and define an interface therebetween, means to cause weld current to flow from one electrode to the other through said interface, and means to apply a forging pressure to said pieces comprising an elongated bar of magnetostrictive material disposed perpendicularly to said interface and adjacent one of said electrodes, said bar being arranged to be in direct contact with said one electrode to move that one electrode toward the other electrode for applying a direct forging pressure to said abutting surfaces a coil positioned adjacent said bar, and means for supplying electric current to said coil to immerse said bar in a magnetic field to cause a single change in length thereof for applying a direct forging pressure to said pieces at said interface.

13. Apparatus for manufacturing a corrugated core structural material by welding spaced apart ridges of a corrugated strip to a second strip comprising means to place said strips adjacent one another such that said ridges contact portions of said second strip to form a plurality of interfaces, a first set of electrodes adapted to be positioned adjacent said interfaces on one side of said strips, a second set of electrodes adapted to be positioned opposite said first set on the other side of said strips such that an interface is located between each pair of opposed electrodes, means to pass welding currents between said opposed pairs of electrodes through said strips and said interfaces for welding said strips together and means for applying a forging pressure to the weld areas adjacent said interfaces comprising a set of elongated bars of magnetostrictive material disposed substantially perpendicular to said interfaces with one end of each of said bars in contact with an associated electrode of said first set, a coil positioned adjacent said bars, and means for supplying electric current to said coil to immerse said bars in a magnetic field to produce a precise and predetermined change in length of said bars, said bars being arranged in cooperation with said first set of electrodes to apply a direct forging impact to said strips upon elongation of said bars under the influence of said magnetic field.

14. In an electric welding apparatus, in combination, a pair of relatively movable electrodes providing parallel current paths, means to introduce two pieces of material to be welded between said electrodes such that the surfaces of said pieces to be welded are in abutting relationship and form an interface parallel to said parallel paths, means for producing a magnetic field about said interface by passing electric currents in the same direction through said electrodes along said parallel paths on either side of said interface, and means to pass electric weld current from one piece of material to the other piece of material through said interface to weld said pieces of material together, said magnetic field being disposed relative to said interface such that it exerts a force on said electric weld current which tends to move said weld current along said interface such that a continuous line weld between said pieces of material is produced.

15. In an electric welding apparatus as set forth in claim 14, further characterized in that said electrodes provide parallel loop current paths.

16. An electric welding apparatus as set forth in claim 14 further including means for applying a forging pressure to said pieces of material which comprises a bar of magnetostrictive material positioned to contact one of said electrodes to move said one electrode relative to the other said electrode when said bar is immersed in a second magnetic field and means to immerse said bar in said second magnetic field.

References Cited in the file of this patent

UNITED STATES PATENTS

| | | |
|---|---|---|
| 1,215,964 | Murray | Feb. 13, 1917 |
| 1,267,480 | Von Henke | May 28, 1918 |
| 1,312,845 | Gravell | Aug. 12, 1919 |
| 1,327,792 | Thornton | Jan. 13, 1920 |

(Other references on following page)

UNITED STATES PATENTS

| | | |
|---|---|---|
| 1,672,702 | Weed | June 5, 1928 |
| 1,976,552 | Friesen | Oct. 9, 1934 |
| 2,232,450 | Hagedorn | Feb. 18, 1941 |
| 2,238,419 | Haas | Apr. 15, 1941 |
| 2,401,528 | Vang | June 4, 1946 |
| 2,464,967 | Dinnick | Mar. 22, 1949 |
| 2,473,772 | Vang | June 21, 1949 |
| 2,747,064 | Van Pappelendam | May 22, 1952 |
| 2,789,203 | Pigo et al. | Apr. 16, 1957 |
| 2,805,320 | Palic | Sept. 3, 1957 |
| 2,846,563 | Cronin | Aug. 5, 1958 |
| 2,882,384 | Foster | Apr. 14, 1959 |

UNITED STATES PATENT OFFICE
CERTIFICATE OF CORRECTION

Patent No. 2,985,743            May 23, 1961

Joseph E. McKeen

It is hereby certified that error appears in the above numbered patent requiring correction and that the said Letters Patent should read as corrected below.

Column 4, line 25, for "for", second occurrence, read -- of --; column 11, line 26, for "said" read -- one --.

Signed and sealed this 24th day of October 1961.

(SEAL)
Attest:

ERNEST W. SWIDER
Attesting Officer

DAVID L. LADD
Commissioner of Patents
USCOMM-DC